US010831278B2

(12) United States Patent
Bell

(10) Patent No.: US 10,831,278 B2
(45) Date of Patent: Nov. 10, 2020

(54) DISPLAY WITH BUILT IN 3D SENSING CAPABILITY AND GESTURE CONTROL OF TV

(71) Applicant: Facebook, Inc., Menlo Park, CA (US)

(72) Inventor: Matthew Bell, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 498 days.

(21) Appl. No.: 15/001,657

(22) Filed: Jan. 20, 2016

(65) Prior Publication Data

US 2016/0231821 A1    Aug. 11, 2016

Related U.S. Application Data

(63) Continuation of application No. 13/591,054, filed on Aug. 21, 2012, now Pat. No. 9,247,236, which is a continuation of application No. 12/400,772, filed on Mar. 9, 2009, now Pat. No. 8,259,163.

(60) Provisional application No. 61/034,828, filed on Mar. 7, 2008.

(51) Int. Cl.
| | |
|---|---|
| *G06F 3/01* | (2006.01) |
| *H04N 13/254* | (2018.01) |
| *H04N 13/239* | (2018.01) |
| *A63F 13/00* | (2014.01) |
| *A63F 13/213* | (2014.01) |
| *G06F 3/03* | (2006.01) |
| *G06F 3/0481* | (2013.01) |
| *G06F 3/0484* | (2013.01) |
| *G06T 13/40* | (2011.01) |
| *G02B 27/00* | (2006.01) |
| *H04N 13/366* | (2018.01) |

(52) U.S. Cl.
CPC .............. *G06F 3/017* (2013.01); *A63F 13/00* (2013.01); *A63F 13/213* (2014.09); *G06F 3/011* (2013.01); *G06F 3/0304* (2013.01); *G06F 3/0481* (2013.01); *G06F 3/04845* (2013.01); *G06T 13/40* (2013.01); *H04N 13/239* (2018.05); *H04N 13/254* (2018.05); *G02B 27/0093* (2013.01); *H04N 13/366* (2018.05)

(58) Field of Classification Search
CPC ...................................................... G06F 3/017
See application file for complete search history.

(56) References Cited

U.S. PATENT DOCUMENTS

| | | |
|---|---|---|
| 2,917,980 A | 12/1959 | Grube et al. |
| 3,068,754 A | 12/1962 | Benjamin et al. |
| 3,763,468 A | 10/1973 | Ovshinsky et al. |

(Continued)

FOREIGN PATENT DOCUMENTS

| | | |
|---|---|---|
| CN | 1289086 A | 3/2001 |
| EP | 0 055 366 A2 | 7/1982 |

(Continued)

OTHER PUBLICATIONS

EffecTV Version 0.2.0 released Mar. 27, 2001, available online at http://web.archive.org/web/20010101-20010625re_http://effectv.sourceforge.net.

(Continued)

*Primary Examiner* — Suraj M Joshi
(74) *Attorney, Agent, or Firm* — FisherBroyles, LLP

(57) ABSTRACT

Information from execution of a vision processing module may be used to control a 3D vision system.

20 Claims, 4 Drawing Sheets

(56) References Cited

U.S. PATENT DOCUMENTS

| | | |
|---|---|---|
| 4,053,208 A | 10/1977 | Kato et al. |
| 4,275,395 A | 6/1981 | Dewey et al. |
| 4,573,191 A | 2/1986 | Kidode et al. |
| 4,725,863 A | 2/1988 | Dumbreck et al. |
| 4,769,697 A | 9/1988 | Gilley et al. |
| 4,791,572 A | 12/1988 | Green et al. |
| 4,843,568 A | 6/1989 | Krueger et al. |
| 4,887,898 A | 12/1989 | Halliburton et al. |
| 4,948,371 A | 8/1990 | Hall |
| 5,001,558 A | 3/1991 | Burley et al. |
| 5,138,304 A | 8/1992 | Bronson |
| 5,151,718 A | 9/1992 | Nelson |
| 5,239,373 A | 8/1993 | Tang et al. |
| 5,276,609 A | 1/1994 | Durlach |
| 5,319,496 A | 6/1994 | Jewell et al. |
| 5,325,472 A | 6/1994 | Horiuchi et al. |
| 5,325,473 A | 6/1994 | Monroe et al. |
| 5,418,583 A | 5/1995 | Masumoto |
| 5,423,554 A | 6/1995 | Davis |
| 5,426,474 A | 6/1995 | Rubstov et al. |
| 5,436,639 A | 7/1995 | Arai et al. |
| 5,442,252 A | 8/1995 | Golz |
| 5,454,043 A | 9/1995 | Freeman |
| 5,473,396 A | 12/1995 | Okajima et al. |
| 5,497,269 A | 3/1996 | Gal |
| 5,510,828 A | 4/1996 | Lutterbach et al. |
| 5,526,182 A | 6/1996 | Jewell et al. |
| 5,528,263 A | 6/1996 | Platzker et al. |
| 5,528,297 A | 6/1996 | Seegert et al. |
| 5,534,917 A | 7/1996 | MacDougall |
| 5,548,694 A | 8/1996 | Gibson |
| 5,591,972 A | 1/1997 | Noble et al. |
| 5,594,469 A | 1/1997 | Freeman et al. |
| 5,633,691 A | 5/1997 | Vogeley et al. |
| 5,662,401 A | 9/1997 | Shimizu et al. |
| 5,703,637 A | 12/1997 | Miyazaki et al. |
| 5,771,307 A | 6/1998 | Lu et al. |
| 5,808,784 A | 9/1998 | Ando et al. |
| 5,846,086 A | 12/1998 | Bizzi et al. |
| 5,861,881 A | 1/1999 | Freeman et al. |
| 5,882,204 A | 3/1999 | Iannazo et al. |
| 5,900,982 A | 5/1999 | Dolgoff et al. |
| 5,923,380 A | 7/1999 | Yang et al. |
| 5,923,475 A | 7/1999 | Kurtz et al. |
| 5,953,152 A | 9/1999 | Hewlett |
| 5,966,696 A | 10/1999 | Giraud |
| 5,969,754 A | 10/1999 | Zeman |
| 5,978,136 A | 11/1999 | Ogawa et al. |
| 5,982,352 A | 11/1999 | Pryor |
| 6,008,800 A | 12/1999 | Pryor |
| 6,058,397 A | 5/2000 | Barrus et al. |
| 6,072,494 A | 6/2000 | Nguyen |
| 6,075,895 A | 6/2000 | Qiao et al. |
| 6,084,979 A | 7/2000 | Kanada et al. |
| 6,088,612 A | 7/2000 | Blair |
| 6,097,369 A | 8/2000 | Wambach |
| 6,097,390 A | 8/2000 | Marks |
| 6,106,119 A | 8/2000 | Edwards |
| 6,118,888 A | 9/2000 | Chino et al. |
| 6,125,198 A | 9/2000 | Onda |
| 6,128,003 A | 10/2000 | Smith et al. |
| 6,166,744 A | 12/2000 | Jaszlics et al. |
| 6,176,782 B1 | 1/2001 | Lyons et al. |
| 6,191,773 B1 | 2/2001 | Maruno et al. |
| 6,195,104 B1 | 2/2001 | Lyons |
| 6,198,487 B1 | 3/2001 | Fortenbery et al. |
| 6,198,844 B1 | 3/2001 | Nomura |
| 6,215,890 B1 | 4/2001 | Matsuo et al. |
| 6,217,449 B1 | 4/2001 | Kaku |
| 6,222,465 B1 | 4/2001 | Kumar et al. |
| 6,254,246 B1 | 7/2001 | Tiao et al. |
| 6,263,339 B1 | 7/2001 | Hirsh |
| 6,270,403 B1 | 8/2001 | Watanabe et al. |
| 6,278,418 B1 | 8/2001 | Doi |
| 6,292,171 B1 | 9/2001 | Fu et al. |
| 6,304,267 B1 | 10/2001 | Sata |
| 6,308,565 B1 | 10/2001 | French et al. |
| 6,323,895 B1 | 11/2001 | Sata |
| 6,333,735 B1 | 12/2001 | Anvekar |
| 6,335,977 B1 | 1/2002 | Kage |
| 6,337,699 B1 | 1/2002 | Nielsen |
| 6,339,748 B1 | 1/2002 | Hiramatsu |
| 6,346,933 B1 | 2/2002 | Lin |
| 6,349,301 B1 | 2/2002 | Mitchell et al. |
| 6,351,222 B1 * | 2/2002 | Swan ............... G08C 23/02 340/13.3 |
| 6,353,428 B1 | 3/2002 | Maggioni et al. |
| 6,359,612 B1 | 3/2002 | Peter et al. |
| 6,377,298 B1 | 4/2002 | Scheele et al. |
| 6,388,657 B1 | 5/2002 | Natoli |
| 6,394,896 B2 | 5/2002 | Sugimoto |
| 6,400,374 B2 | 6/2002 | Lanier |
| 6,407,870 B1 | 6/2002 | Hurevich et al. |
| 6,414,672 B2 | 7/2002 | Rekimoto et al. |
| 6,445,815 B1 | 9/2002 | Sato |
| 6,454,419 B2 | 9/2002 | Kitazawa |
| 6,464,375 B1 | 10/2002 | Wada et al. |
| 6,476,834 B1 | 11/2002 | Doval et al. |
| 6,477,239 B1 | 11/2002 | Ohki et al. |
| 6,480,267 B2 | 11/2002 | Yanagi et al. |
| 6,491,396 B2 | 12/2002 | Karasawa et al. |
| 6,501,515 B1 | 12/2002 | Iwamura |
| 6,513,953 B1 | 2/2003 | Itoh |
| 6,522,312 B2 | 2/2003 | Ohshima et al. |
| 6,545,706 B1 | 4/2003 | Edwards et al. |
| 6,552,760 B1 | 4/2003 | Gotoh et al. |
| 6,598,978 B2 | 7/2003 | Hasegawa |
| 6,607,275 B1 | 8/2003 | Cimini et al. |
| 6,611,241 B1 | 8/2003 | Firester et al. |
| 6,654,734 B1 | 11/2003 | Mani et al. |
| 6,658,150 B2 | 12/2003 | Tsuji et al. |
| 6,661,918 B1 | 12/2003 | Gordon et al. |
| 6,677,969 B1 | 1/2004 | Hongo |
| 6,707,054 B2 | 3/2004 | Ray |
| 6,707,444 B1 | 3/2004 | Hendriks et al. |
| 6,712,476 B1 | 3/2004 | Ito et al. |
| 6,720,949 B1 | 4/2004 | Pryor et al. |
| 6,732,929 B2 | 5/2004 | Good et al. |
| 6,747,666 B2 | 6/2004 | Utterback |
| 6,752,720 B1 | 6/2004 | Clapper et al. |
| 6,754,370 B1 | 6/2004 | Hall-Holt et al. |
| 6,791,700 B2 | 9/2004 | Omura et al. |
| 6,792,398 B1 | 9/2004 | Handley et al. |
| 6,808,293 B2 | 10/2004 | Watanabe et al. |
| 6,826,727 B1 | 11/2004 | Mohr et al. |
| 6,831,664 B2 | 12/2004 | Marmaropoulos et al. |
| 6,871,982 B2 | 3/2005 | Holman et al. |
| 6,873,710 B1 | 3/2005 | Cohen-Solal et al. |
| 6,877,882 B1 | 4/2005 | Haven et al. |
| 6,882,480 B2 | 4/2005 | Yanagisawa |
| 6,902,310 B2 | 6/2005 | Im |
| 6,912,313 B2 | 6/2005 | Li |
| 6,965,693 B1 | 11/2005 | Kondo et al. |
| 6,975,360 B2 | 12/2005 | Slatter |
| 6,996,460 B1 | 2/2006 | Krahnstoever et al. |
| 6,999,600 B2 | 2/2006 | Venetianer |
| 7,000,200 B1 | 2/2006 | Martins |
| 7,001,023 B2 | 2/2006 | Lee et al. |
| 7,006,236 B2 | 2/2006 | Tomasi et al. |
| 7,015,894 B2 | 3/2006 | Morohoshi |
| 7,042,440 B2 | 5/2006 | Pryor et al. |
| 7,050,177 B2 | 5/2006 | Tomasi et al. |
| 7,054,068 B2 | 5/2006 | Yoshida et al. |
| 7,058,204 B2 | 6/2006 | Hildreth et al. |
| 7,068,274 B2 | 6/2006 | Welch et al. |
| 7,069,516 B2 | 6/2006 | Rekimoto |
| 7,084,859 B1 | 8/2006 | Pryor et al. |
| 7,088,508 B2 | 8/2006 | Ebina et al. |
| 7,095,401 B2 | 8/2006 | Liu et al. |
| 7,129,927 B2 | 10/2006 | Mattsson |
| 7,149,262 B1 | 12/2006 | Nayar et al. |
| 7,158,676 B1 | 1/2007 | Rainsford |
| 7,170,492 B2 | 1/2007 | Bell |
| 7,190,832 B2 | 3/2007 | Frost et al. |

(56) References Cited

U.S. PATENT DOCUMENTS

| | | | |
|---|---|---|---|
| 7,193,608 B2 | 3/2007 | Stuerzlinger | |
| 7,227,526 B2 | 6/2007 | Hildreth et al. | |
| 7,259,747 B2 | 8/2007 | Bell | |
| 7,262,874 B2 | 8/2007 | Suzuki | |
| 7,268,950 B2 | 9/2007 | Poulsen | |
| 7,274,800 B2 | 9/2007 | Nefian et al. | |
| 7,289,130 B1 | 10/2007 | Satoh et al. | |
| 7,330,584 B2 | 2/2008 | Weiguo et al. | |
| 7,331,856 B1 | 2/2008 | Nakamura et al. | |
| 7,339,521 B2 | 3/2008 | Scheidemann et al. | |
| 7,340,077 B2 | 3/2008 | Gokturk et al. | |
| 7,348,963 B2 | 3/2008 | Bell | |
| 7,367,887 B2 | 5/2008 | Watabe et al. | |
| 7,379,563 B2 | 5/2008 | Shamaie | |
| 7,382,897 B2 | 6/2008 | Brown et al. | |
| 7,394,459 B2 | 7/2008 | Bathiche et al. | |
| 7,428,542 B1 | 9/2008 | Fink et al. | |
| 7,431,253 B2 | 10/2008 | Yeh | |
| 7,432,917 B2 | 10/2008 | Wilson et al. | |
| 7,468,742 B2 | 12/2008 | Ahn et al. | |
| 7,480,870 B2 | 1/2009 | Anzures et al. | |
| 7,536,032 B2 | 5/2009 | Bell | |
| 7,559,841 B2 | 7/2009 | Hashimoto | |
| 7,576,727 B2 | 8/2009 | Bell | |
| 7,593,552 B2 | 9/2009 | Higaki et al. | |
| 7,598,942 B2 | 10/2009 | Underkoffler et al. | |
| 7,619,824 B2 | 11/2009 | Poulsen | |
| 7,665,041 B2 | 2/2010 | Wilson et al. | |
| 7,671,321 B2 | 3/2010 | Perlman et al. | |
| 7,710,391 B2 | 5/2010 | Bell et al. | |
| 7,724,280 B2 | 5/2010 | Gin et al. | |
| 7,728,280 B2 | 6/2010 | Feilkas et al. | |
| 7,737,636 B2 | 6/2010 | Li et al. | |
| 7,738,725 B2 | 6/2010 | Raskar et al. | |
| 7,745,771 B2 | 6/2010 | Troxell et al. | |
| 7,769,205 B2 | 8/2010 | Arias-Estrada et al. | |
| RE41,685 E | 9/2010 | Feldman et al. | |
| 7,809,167 B2 | 10/2010 | Bell | |
| 7,834,846 B1 | 11/2010 | Bell | |
| 7,873,906 B2 | 1/2011 | Womack | |
| 7,907,117 B2 | 3/2011 | Wilson et al. | |
| 7,961,906 B2 | 6/2011 | Ruedin | |
| 7,971,156 B2 | 6/2011 | Albertson et al. | |
| 8,018,579 B1* | 9/2011 | Krah | G01B 11/00 356/4.01 |
| 8,035,612 B2 | 10/2011 | Bell et al. | |
| 8,035,624 B2 | 10/2011 | Bell et al. | |
| 8,064,704 B2 | 11/2011 | Kim et al. | |
| 8,072,470 B2 | 12/2011 | Marks | |
| 8,081,822 B1 | 12/2011 | Bell | |
| 8,085,293 B2 | 12/2011 | Brodsky et al. | |
| 8,085,994 B2 | 12/2011 | Kim | |
| 8,098,277 B1 | 1/2012 | Bell | |
| 8,121,352 B2 | 2/2012 | Arias-Estrada et al. | |
| 8,159,682 B2 | 4/2012 | Bell | |
| 8,199,108 B2 | 6/2012 | Bell et al. | |
| 8,230,367 B2 | 7/2012 | Bell et al. | |
| 8,259,163 B2 | 9/2012 | Bell et al. | |
| 8,487,866 B2 | 7/2013 | Bell et al. | |
| 8,611,667 B2 | 12/2013 | Wilson et al. | |
| 8,745,541 B2 | 6/2014 | Wilson et al. | |
| 8,810,803 B2 | 8/2014 | Bell | |
| 2001/0012001 A1 | 8/2001 | Rekimoto et al. | |
| 2001/0033675 A1 | 10/2001 | Maurer et al. | |
| 2002/0006583 A1 | 1/2002 | Michiels et al. | |
| 2002/0032697 A1 | 3/2002 | French et al. | |
| 2002/0032906 A1 | 3/2002 | Grossman | |
| 2002/0041327 A1 | 4/2002 | Hildreth et al. | |
| 2002/0046100 A1 | 4/2002 | Kinjo | |
| 2002/0064382 A1 | 5/2002 | Hildreth et al. | |
| 2002/0073417 A1 | 6/2002 | Kondo et al. | |
| 2002/0078441 A1 | 6/2002 | Drake et al. | |
| 2002/0081032 A1 | 6/2002 | Chen et al. | |
| 2002/0103617 A1 | 8/2002 | Uchiyama et al. | |
| 2002/0105623 A1 | 8/2002 | Pinhanez | |
| 2002/0130839 A1 | 9/2002 | Wallace et al. | |
| 2002/0140633 A1 | 10/2002 | Rafii et al. | |
| 2002/0140682 A1 | 10/2002 | Brown et al. | |
| 2002/0158984 A1 | 10/2002 | Brodsky et al. | |
| 2002/0178440 A1 | 11/2002 | Agnihorti et al. | |
| 2002/0186200 A1 | 12/2002 | Green | |
| 2003/0032484 A1 | 2/2003 | Ohshima et al. | |
| 2003/0065563 A1 | 4/2003 | Elliott et al. | |
| 2003/0076293 A1 | 4/2003 | Mattsson | |
| 2003/0078840 A1 | 4/2003 | Strunk et al. | |
| 2003/0091724 A1 | 5/2003 | Mizoguchi | |
| 2003/0093784 A1 | 5/2003 | Dimitrova et al. | |
| 2003/0098819 A1 | 5/2003 | Sukthankar et al. | |
| 2003/0103030 A1 | 6/2003 | Wu | |
| 2003/0113018 A1 | 6/2003 | Nefian et al. | |
| 2003/0122839 A1 | 7/2003 | Matraszek et al. | |
| 2003/0126013 A1 | 7/2003 | Shand | |
| 2003/0137494 A1 | 7/2003 | Tulbert | |
| 2003/0156756 A1 | 8/2003 | Gokturk et al. | |
| 2003/0161502 A1 | 8/2003 | Morihara et al. | |
| 2003/0178549 A1 | 9/2003 | Ray | |
| 2003/0218760 A1* | 11/2003 | Tomasi | G06F 1/1626 356/614 |
| 2004/0005924 A1 | 1/2004 | Watabe et al. | |
| 2004/0015783 A1 | 1/2004 | Lennon et al. | |
| 2004/0046744 A1 | 3/2004 | Rafii et al. | |
| 2004/0073541 A1 | 4/2004 | Lindblad et al. | |
| 2004/0091110 A1 | 5/2004 | Barkans | |
| 2004/0095768 A1 | 5/2004 | Watanabe et al. | |
| 2004/0155962 A1 | 8/2004 | Marks | |
| 2004/0165006 A1 | 8/2004 | Kirby et al. | |
| 2004/0193413 A1 | 9/2004 | Wilson et al. | |
| 2004/0212725 A1 | 10/2004 | Raskar et al. | |
| 2005/0002544 A1* | 1/2005 | Winter | G08G 1/14 382/104 |
| 2005/0028188 A1 | 2/2005 | Latona et al. | |
| 2005/0039206 A1 | 2/2005 | Opdycke | |
| 2005/0086695 A1 | 4/2005 | Keele et al. | |
| 2005/0088407 A1 | 4/2005 | Bell | |
| 2005/0091614 A1 | 4/2005 | Wasko et al. | |
| 2005/0104506 A1 | 5/2005 | Youh et al. | |
| 2005/0122308 A1 | 6/2005 | Bell et al. | |
| 2005/0132266 A1 | 6/2005 | Ambrosino et al. | |
| 2005/0147135 A1 | 7/2005 | Kurtz et al. | |
| 2005/0147282 A1 | 7/2005 | Fujii | |
| 2005/0151850 A1 | 7/2005 | Ahn et al. | |
| 2005/0185828 A1 | 8/2005 | Semba et al. | |
| 2005/0195598 A1 | 9/2005 | Dancs et al. | |
| 2005/0265587 A1 | 12/2005 | Schneider | |
| 2006/0001760 A1 | 1/2006 | Matsumura et al. | |
| 2006/0010400 A1 | 1/2006 | Dehlin et al. | |
| 2006/0013440 A1 | 1/2006 | Cohen et al. | |
| 2006/0031786 A1 | 2/2006 | Hillis et al. | |
| 2006/0056509 A1* | 3/2006 | Suino | A63F 13/00 375/240.11 |
| 2006/0078015 A1 | 4/2006 | Franck | |
| 2006/0111182 A1 | 5/2006 | Nakanishi et al. | |
| 2006/0132432 A1 | 6/2006 | Bell | |
| 2006/0132725 A1 | 6/2006 | Terada et al. | |
| 2006/0139314 A1* | 6/2006 | Bell | A63F 13/02 345/156 |
| 2006/0168515 A1 | 7/2006 | Dorsett, Jr. et al. | |
| 2006/0184993 A1 | 8/2006 | Goldthwaite et al. | |
| 2006/0187196 A1 | 8/2006 | Underkoffler et al. | |
| 2006/0187545 A1 | 8/2006 | Doi | |
| 2006/0227099 A1 | 10/2006 | Han et al. | |
| 2006/0242145 A1 | 10/2006 | Krishnamurthy et al. | |
| 2006/0256382 A1 | 11/2006 | Matraszek et al. | |
| 2006/0258397 A1 | 11/2006 | Kaplan et al. | |
| 2006/0294247 A1 | 12/2006 | Hinckley et al. | |
| 2006/0294258 A1 | 12/2006 | Powers-Boyle et al. | |
| 2007/0001071 A1 | 1/2007 | Yeh | |
| 2007/0002039 A1 | 1/2007 | Pendleton et al. | |
| 2007/0019066 A1 | 1/2007 | Cutler | |
| 2007/0199035 A1 | 8/2007 | Schwartz et al. | |
| 2007/0209009 A1 | 9/2007 | Huang | |
| 2007/0259716 A1 | 11/2007 | Mattice et al. | |
| 2007/0285419 A1 | 12/2007 | Givon | |
| 2008/0013826 A1 | 1/2008 | Hillis et al. | |

(56) References Cited

U.S. PATENT DOCUMENTS

| | | |
|---|---|---|
| 2008/0018595 A1 | 1/2008 | Hildreth et al. |
| 2008/0030460 A1 | 2/2008 | Hildreth et al. |
| 2008/0036732 A1 | 2/2008 | Wilson et al. |
| 2008/0040692 A1 | 2/2008 | Sunday et al. |
| 2008/0062123 A1 | 3/2008 | Bell |
| 2008/0062257 A1 | 3/2008 | Corson |
| 2008/0089587 A1 | 4/2008 | Kim et al. |
| 2008/0090484 A1 | 4/2008 | Lee et al. |
| 2008/0123109 A1 | 5/2008 | Iwasaki |
| 2008/0135733 A1 | 6/2008 | Feilkas et al. |
| 2008/0150890 A1 | 6/2008 | Bell et al. |
| 2008/0159591 A1 | 7/2008 | Ruedin |
| 2008/0170123 A1 | 7/2008 | Albertson et al. |
| 2008/0170776 A1* | 7/2008 | Albertson ............... G06F 21/35 382/154 |
| 2008/0179507 A2 | 7/2008 | Han |
| 2008/0212306 A1 | 9/2008 | Huang et al. |
| 2008/0252596 A1 | 10/2008 | Bell et al. |
| 2008/0267447 A1 | 10/2008 | Kelusky et al. |
| 2008/0284925 A1 | 11/2008 | Han |
| 2008/0292144 A1 | 11/2008 | Kim |
| 2008/0320394 A1 | 12/2008 | Womack |
| 2009/0027337 A1 | 1/2009 | Hildreth |
| 2009/0031240 A1 | 1/2009 | Hildreth |
| 2009/0079813 A1 | 3/2009 | Hildreth |
| 2009/0102788 A1 | 4/2009 | Nishida et al. |
| 2009/0106785 A1 | 4/2009 | Pharn |
| 2009/0172606 A1 | 7/2009 | Dunn et al. |
| 2009/0179733 A1 | 7/2009 | Hattori et al. |
| 2009/0228841 A1 | 9/2009 | Hildreth |
| 2009/0235295 A1 | 9/2009 | Bell et al. |
| 2009/0256801 A1 | 10/2009 | Helmer |
| 2010/0026624 A1 | 2/2010 | Bell et al. |
| 2010/0039500 A1 | 2/2010 | Bell et al. |
| 2010/0060722 A1 | 3/2010 | Bell |
| 2010/0121866 A1 | 5/2010 | Bell et al. |
| 2011/0041100 A1 | 2/2011 | Boillot |
| 2011/0157316 A1 | 6/2011 | Okamoto et al. |
| 2012/0080411 A1 | 4/2012 | Mizuyama et al. |
| 2012/0200843 A1 | 8/2012 | Bell et al. |
| 2012/0287044 A1 | 11/2012 | Bell et al. |
| 2012/0293625 A1 | 11/2012 | Schneider et al. |

FOREIGN PATENT DOCUMENTS

| | | |
|---|---|---|
| EP | 0 626 636 A2 | 11/1994 |
| EP | 0 913 790 A1 | 5/1999 |
| EP | 1 087 327 A2 | 3/2001 |
| EP | 1 689 172 | 6/2002 |
| JP | 57-094672 | 6/1982 |
| JP | 10-207619 | 8/1998 |
| JP | 11-057216 | 3/1999 |
| JP | 2000-105583 | 4/2000 |
| JP | 2002-014997 | 1/2002 |
| JP | 2002-092023 | 3/2002 |
| JP | 2002-171507 | 6/2002 |
| JP | 2003-517642 | 5/2003 |
| JP | 2003-271084 | 9/2003 |
| JP | 2004-246578 | 9/2004 |
| JP | 2007-514242 | 5/2007 |
| KR | 2003-0058894 | 7/2003 |
| WO | WO 98/38533 A1 | 9/1998 |
| WO | WO 00/16562 A1 | 3/2000 |
| WO | WO 01/63916 A1 | 8/2001 |
| WO | WO 02/01537 A2 | 1/2002 |
| WO | WO 02/100094 A2 | 12/2002 |
| WO | WO 2004/055776 A1 | 7/2004 |
| WO | WO 2004/097741 A1 | 11/2004 |
| WO | WO 2005/003948 A1 | 1/2005 |
| WO | WO 2005/041578 A2 | 5/2005 |
| WO | WO 2005/041579 A2 | 5/2005 |
| WO | WO 2005/057398 A2 | 6/2005 |
| WO | WO 2005/057399 A2 | 6/2005 |
| WO | WO 2005/057921 A2 | 6/2005 |
| WO | WO 2005/091651 A2 | 9/2005 |
| WO | WO 2007/019443 A1 | 2/2007 |
| WO | WO 2008/124820 A1 | 10/2008 |
| WO | WO 2009/035705 A1 | 3/2009 |

OTHER PUBLICATIONS

Index of EffecTV, as downloaded on Apr. 30, 2007 at http://effectiv.cvs.sourceforge.net/effectv/EffecTV/?pathrev=rel_0_2_0.

R111, The Transformation From Digital Information to Analog Matter, available online at http://www.particles.de/paradocs/r111/10mkp2004/hmtl/r111_text111hock04.html, cited on Jan. 17, 2005 during opposition of European Application No. 02739710.8, filed Jun. 4, 2002.

2001 Symposium on Interactive 3D Graphics program description, ACM SIGGRAPH, held Mar. 19-21, 2001, Research Triangle Park, NC, downloaded from http://www.allconferences.com/conferences/20008300926 31/; cited during opposition of European Application No. 02739710.8, filed Jun. 4, 2002.

Announcement: Workshop on Perceptual User Interfaces, The Banff Rocky Mountain Resort, Banff, Alberta, Canada, Oct. 20-21, 1997, can be found at http://www.research.microsoft.com/PUIWorkshop/, cited during opposition of European Application No. 02739710.8, filed Jun. 4, 2002.

Bodymover Body Movement as a Means to Obtain an Audiovisual Spatial Experience, 2000 ART+COM AG Berlin; http://www.artcom.de/index.php?option=com_acprojects&page=6&id=28&Itemid=144&details=0&lang=en, as downloaded on Aug. 8, 2005.

ART+COM Bodymover 2000, as downloaded on Aug. 21, 2009 from http://www.artcom.de/index.php?option=com_acprojects&page=6&id=28&Itemid=144&details=0&lang=en, cited during opposition of European Application No. 02739710.8, filed Jun. 4, 2002.

Brown, Matthew, et al. "Multi-Image Matching using Multi-Scale Oriented Patches," Technical Report, Dec. 2004, pp. 1-48, available online at ftp://ftp.research.microsoft.com/pub/tr/TR-2004-133.pdf.

Brown, Matthew, et al., "Multi-Image Matching using Multi-Scale Oriented Patches," Proceedings of the 2005 IEEE Computer Society Conference on Computer Vision and Pattern Recognition, Conference Publication Date: Jun. 20-25, 2005, 8 pgs.

Buxton, Bill, "Multi-Touch Systems That I Have Known and Loved," accessed Mar. 21, 2007, http://billbuxton.com/multitouchOverview.html.

Crouser, P.D., et al., "Unattenuated tracer particle extraction through time-averaged, background image subtraction with outlier rejection," Experiments in Fluids, 22, 1997, 220-228, Springer-Verlag.

Dachselt, Raimund, et al., "CONTIGRA: An XML-Based Architecture for Component-Oriented 3D Applications, 3D Technologies for the World Wide Web, Proceedings of the Seventh International Conference on 3D Technology," ACM, Feb. 24-28, 2002, pp. 155-163.

Davis, J.W., et al., "SIDEshow: A Silhouette-based Interactive Dual-screen Environment," Aug. 1998, MIT Media Lab Tech Report No. 457.

Demarest, Ken, "Sand," 2000, Mine Control, art installation, available online at http://www.mine-control.com, downloaded on Mar. 15, 2007.

DePiero et al; "3-D Computer Vision Using Structured Light: Design, Calibrations and Implementation Issues"; Advances in Computers, vol. 43, pp. 243-278, 1996.

EffecTV Software Source: effect module, dated May 20, 2001 (German); cited during opposition of European Application No. 02739710.8, filed Jun. 4, 2002.

Elgammal, Ahmed, et al., "Non-parametric Model for Background Subtraction," Jun. 2000, European Conference on Computer Vision, Lecture Notes on Computer Science, vol. 1843, pp. 751-767.

Foerterer, Holger, "Fluidum," 1999, art installation, description available online at http://www.foerterer.com/fluidum, downloaded on Mar. 16, 2007.

Foerterer, Holger, "Helikopter," 2001, art installation, description available online at http://www.foerterer.com/hellkopter/index.htm, downloaded on Mar. 16, 2007.

(56) References Cited

OTHER PUBLICATIONS

Freeman, William, et al., "Computer vision for interactive computer graphics," May-Jun. 1998, IEEE Computer Graphics and Applications, vol. 18, No. 3, pp. 42-53.

Frisken, Sarah F. et al., "Adaptively Sampled Distance Fields: A General Representation of Shape for Computer Graphics," Jul. 23-28, 2000, Proceedings Of the 27th Annual Conference on Computer Graphics and Interactive Techniques, pp. 249-254.

Fujihata, Masaki, "Beyond Pages," 1995, art installation, description available online at http://on1.zkm.de/zkm/werke/BeyondPages, downloaded on Mar. 16, 2007.

Goetz, Frank, et al., "An XML-based Visual Shading Language for Vertex and Fragment Shaders," 3D Technologies for the World Wide Web, Proceedings of Ninth International Conference on 3D Technology; ACM, Apr. 5-8, 2004; pp. 87-97.

GroundFX Document, GestureTek (Very Vivid, Inc.), description available online at http://www.gesturetek.com/groundfx, downloaded on Aug. 11, 2006.

Haller, Michael et al., "Coeno-Storyboard: An Augmented Surface for Storyboard Presentations," Mensch & Computer 2005, Sep. 4-7, 2005, Linz, Austria.

Han, Jefferson Y., "Low-Cost Multi-Touch Sensing Through Frustrated Total Internal Reflection," Oct. 23-26, 2005, ACM Symposium on User Interface Software and Technology (UIST).

Harville, Michael et al., "Foreground Segmentation Using Adaptive Mixture Models in Color and Depth," Jul. 8, 2001, Proceedings of IEEE Workshop on Detection and Recognition of Events in Video, pp. 3-11.

Hemmer, Raphael Lozano, "Body Movies," 2002, art project/installation, description available online at http://www.lozano-hemmer.com/eproyecto.html, downloaded on Mar. 16, 2007.

Hoff, Kenneth E. III et al, "Fast and Simple 2D Geometric Proximity Queries Using Graphics Hardware," Mar. 19-21, 2001, Proc. Of the 2001 Symposium on Interactive 3D Graphics, pp. 145-148.

Huang, Mark et al. "Shadow Vision," Introduction to Computer Graphics, Fall 1999, Dec. 6, 1999; pp. 1-10, XP55013291 http://groups.csail.mit.edu/graphics/classes/6.837/F99/projects/reports/team16.pdf.

Ivars Peterson, "Artificial reality; combining a person's live video image with computer graphics suggests novel ways of working and playing with computers" Science News, Jun. 22, 1985.

Jabri, Sumer et al., "Detection and Location of People in Video Images Using Adaptive Fusion of Color and Edge Information;" presented at the Int. Conf. Pattern Recognition, Barcelona, Spain, 2000.

Joyce, Arthur W. III, et al., "Implementation and capabilities of a virtual interaction system," Sep. 10-11, 1998, Proceedings 2nd European Conference on Disability, Virtual Reality and Associated Technologies, Skovde, Sweden, pp. 237-245.

Katz, Itai et al., "A Multi-Touch Surface Using Multiple Cameras," Oct. 3, 2007, Advanced Concepts for Intelligent Vision Systems, vol. 4678/2007.

Keays, Bill, "metaField Maze," 1998, exhibited at Siggraph'99 Emerging Technologies and Ars Electronica Aug. 8-13, 1999, description available online at http://www.billkeays.com/metaFieldInfosheet1A.pdf.

Keays, Bill, "Using High-Bandwidth Input/Output in Interactive Art," Jun. 1999, Master's Thesis, Massachusetts Institute of Technology, School of Architecture and Planning.

Khan, Jeff; "Intelligent Room with a View"; Apr.-May 2004, RealTime Arts Magazine, Issue 60, available online at www.realtimearts.net/article/60/7432.

Kjeldsen, Rick et al., "Dynamically Reconfigurable Vision-Based User Interfaces," Apr. 2003, 3rd International Conference on Vision Systems (ICVVS '03), Graz, Austria, pp. 6-12.

Kjeldsen, R. et al., "Interacting with Steerable Projected Displays," May 20-21, 2002, Proceedings Of the 5th International Conference on Automatic Face and Gesture Recognition, Washington, D.C.

Kreuger, Myron, "Videoplace—An Artificial Reality," Apr. 1985, Conference on Human Factors in Computing Systems, San Francisco, California, pp. 35-40.

Kreuger, Myron, "Videoplace," 1969 and subsequent, summary available online at http://www.itnimoy.com/itp/newmediahistory/videoplace, downloaded Mar. 21, 2007.

Kurapati, Kaushal, et al., "A Multi-Agent TV Recommender," Jul. 13-14, 2001, Workshop on Personalization in Future TV, pp. 1-8, XP02228335.

Lamarre, Mathieu, et al., "Background subtraction using competing models in the block-DCT domain," Pattern Recognition, 2002 Proceedings, 16 International Conference in Quebec City, Que., Canada, Aug. 11-15, 2002.

Langer, Maria, "Mac OS X 10.2: Visual QuickStart Guide," Sep. 17, 2002, Peachpit Press, p. 111.

Lantagne, Michel, et al., "VIP: Vision tool for comparing Images of People," Vision Interface, Jun. 11-13, 2003, pp. 1-8.

Leibe, Bastian, et al., "The Perspective Workbench; Toward Spontaneous and Natural Interaction in Semi-Immersive Virtual Environments," Mar. 18-22, 2000, IEEE Computer Society, Los Alamitos, CA; pp. 13-20.

Leibe, Bastian, et al., "Towards Spontaneous Interaction with the Perceptive Workbench, a Semi-Immersive Virtual Environment," Nov./Dec. 2000, IEEE Computer Graphics and Applications, vol. 20, No. 6, pp. 54-65.

Lengyel, Jed et al., "Real-Time Robot Motion Planning Using Rasterizing Computer Graphics Hardware," Aug. 1990, ACM SIGGRAPH Computer Graphics, vol. 24, Issue 4, pp. 327-335.

Levin, Golan "Computer Vision for Artists and Designers: Pedagogic Tools and Techniques for Novice Programmers," Aug. 2006, AI & Society, vol. 20, Issue 4, pp. 462-482.

Lin, Mingxiu et al., "A New Approach for Vision-based Rear Vehicle Tracking," Key Laboratory of Integrated Automation of Process Industry, Ministry of Education, Northeastern University, Shenyang, Liaoning Province, China, held May 23-25, 2007, pp. 107-1.

Livingston, Mark Alan, "Vision-based Tracking with Dynamic Structured Light for Video See-through Augmented Reality," 1998, Ph.D. Dissertation, University of North Carolina at Chapel Hill, cited on Jun. 18, 2007 during opposition of European Application N.

Malik, Shahzad et al., "Visual Touchpad: A Two-Handed Gestural Input Device," Oct. 13-15, 2004, International Conference on Multimodal Interfaces (ICMI '04).

MacIver, Malcolm, et al., "Body Electric," Apr. 15-Jun. 29, 2003, art installation, description available online at http://www.neuromech.northwestern.edu/uropatagium/#ArtSci.

Mandala Systems, "Video Gesture Control System Concept," 1986, description available online at <http://www.vividgroup.com/tech.html>, downloaded on Mar. 16, 2007.

Microsoft Surface multi-touch interface table unveiled, May 30, 2007, downloaded from http://www.dancewithshadows.com/tech/microsoft-surface.asp.

Microsoft Surface Web Page, downloaded from http://www.microsoft.com/surface/Pages/Product/WhatIs.aspx on Sep. 24, 2009.

Experience Microsoft Surface, downloaded from http://www.microsoft.com/surface/Pages/Product/Specifications.aspx on Sep. 24, 2009.

Microsoft Surface, downloaded from http://en.wikipedia.org/wiki/Microsoft_surface on Sep. 24, 2009.

Mitsubishi DiamondTouch, http://www.merl.com/projects/DiamondTouch/ visited Mar. 21, 2007.

Mo, Zhenyao "SmartCanvas: A Gesture-Driven Intelligent Drawing Desk System," Jan. 9-12, 2005, Proceedings of Intelligent User Interfaces (IUI '05).

Morano, Raymond A. et al., "Structured Light Using Pseudorandom Codes," Mar. 1998, IEEE Transactions on Pattern Analysis and Machine Intelligence, vol. 20, No. 3.

Morris, T. et al., "Real-Time Fingertip Detection for Hand Gesture Recognition," Sep. 9-11, 2002, Advanced Concepts for Intelligent Vision Systems (ACIVS '04), Ghent University, Belgium.

Muench, Wolfgang, "Bubbles", Prix Ars Electonica Catalog 1999, Springer-Verlag, Berlin, Germany; available online at http://hosting.zkm.de/wmuench/bub/text, downloaded on Mar. 16, 2007.

(56) References Cited

OTHER PUBLICATIONS

Paradiso, Joseph et al., "Optical Tracking for Music and Dance Performance," Conference on Optical 3D Measurement Techniques, XX, XX, No. 4th, Sep. 30, 1997, pp. 1-8, XP002548974. http://www.media.mit.edu/reseny/pubs/papers/97_09_Zurich_3D4.pdf.

Paradiso, Joseph et al., "New Sensor and Music Systems for Large Interactive Surfaces," Aug. 2000, Proceedings Of the Interactive Computer Music Conference, Berlin, Germany, pp. 277-280.

Penny, Simon, "Fugitive"; Oct. 1997; http://www.ace.uci.edu/penny/works/fugitive/fugitive.html.

Penny, Simon, et al., "Fugitive II, " Jan. 8-Mar. 14, 2004, Australian Center for the Moving Image, art installation, description available online at http://www.acmi.net.au/fugitive.jsp?.

Penny, Simon, et al.; Traces: Wireless full body tracking in the Cave, Dec. 16-18, 1999; Japan; ICAT Virtual Reality Conference; http://turing.ace.uci.edu/pennytexts/traces/.

Pinhanez, C. et al., "Ubiquitous Interactive Graphics," Jul. 29-31 2003, IBM Research Report RC22495, available at http://www.research.ibm.com/ed/publications/rc22495.pdf.

Pinhanez, C., "The Everywhere Displays Projector: A Device to Create Ubiquitous Graphical Interfaces", Ubicomp 2001:Ubiquitous Computing: International Conference Atlanta, Georgia, USA, Sep. 30-Oct. 2, 2001; pp. 315-331.

Plasma: 3 pages; http://www.particies.de/paradocs/plasma/index.html, cited in U.S. Appl. No. 10/160,217 on Aug. 8, 2005.

Quinz, Emanuele; "Conference Papers", Apr. 10, 2001, XP55013293, Retrieved from the internet http://www.isea2000.com/pop_actes.htm.

Quinz, Emanuele; "Digital Performance", pp. 1-3, Retrieved from the internet on Nov. 28, 2011 http://www.noemalab.org/sections/ideas/ideas_articles/pdf/.

Reatrix, Inc. website, Mar. 28, 2003, http://web.archive.org/web/20030328234205/http://www.reatrix.com and http://web.archive.org/web/20030328234205/http://www.reatrix.com/webdemo.php.

Rekimoto, J., et al., "Perceptual Surfaces: Towards a Human and Object Sensitive Interactive Display," Oct. 19-21, 1997, Proceedings Of the Workshop on Perceptual User Interfaces, Banff, Canada, pp. 30-32.

Rekimoto, Jun, "SmartSkin: An Infrastructure for Freehand Manipulation on Interactive Surfaces." vol. No. 4, Issue No. 1, pp. 113-120, Apr. 2002.

Ringel, M. et al., "Barehands: Implement-Free Interaction with a Wall-Mounted Display," Mar. 31-Apr. 5, 2001, Proceedings Of the 2001 ACM CHI Conference on Human Factors in Computing Systems (Extended Abstracts), p. 367-368.

Rogala, Miroslav, "Lovers Leap," Nov. 21-26, 1995, art installation, Dutch Electronic Arts Festival, description available online at http://wayback.v2.nl/DEAF/persona/rogala.html.

Rokeby, David, "Very Nervous System (VNS)," Mar. 1995, Wired Magazine, available online at http://www.wired.com/wired/archive/3.03/rokeby.html; sold as software at http://homepage.mac.com/davidrokeby/softVNS.html.

Rokeby, David, "softVNS 2 real time video processing and tracking software for Max;" SoftVNS 2 downloads, as downloaded from http://homepage.mac.com/davidrokeby/softVNS.html on Mar. 16, 2007.

Sato, Yoichi, et al., "Fast Tracking of Hands and Fingertips in Infrared Images for Augmented Desk Interface," Mar. 2000, 4th International Conference on Automatic Face- and Gesture-Recognition, Grenoble, France.

Schneider, John K., "Improved Fingerprint System Using Rolled and Multi-segmented Techniques," U.S. Appl. No. 60/575,952, filed Jun. 1, 2004, pp. 1-6.

Screenshots of Reactrix Product Demo Video, Mar. 28, 2003, http://web.archive.org/web/20030407174258/http://www.reatrix.com/demo/reactrix_demo.wmv.

Sester, Marie, "Access," Dec. 2001, Interaction 99 Biennial Catalog, Gifu, Japan, available online at http://www.accessproject.net/concept.html.

Snibbe, Scott, "Boundary Functions," Sep. 7-12, 1998, art installation, description available online at http://snibbe.com/scott/bf/index.html.

Snibbe, Scott, "Screen Series," 2002-2003 art installation, description available online at http://snibbe.com/scott/screen/index.html downloaded on Mar. 16, 2007.

Sonneck, Georg, et al., "Optimized One-to-One Personalization of Web Applications using a Graph Based Model," IEEE-22, Apr. 26, 2003, 9 pgs.

Sparacino, Flavia, et al., "Dance Space: An Interactive Video Interface", Actes/Proceeding, ISEA2000—Oct. 12, 2000—Auditorium 1, Dec. 10, 2000.

Sparacino, Flavia, et al., "Media in performance: interactive spaces for dance, theater, circus and museum exhibits," Nov. 2000, IBM Systems Journal, vol. 39, No. 3-4, pp. 479-510.

Sparacino, Flavia, "(Some) Computer Visions Based Interfaces for Interactive Art and Entertainment Installations," 2001, INTER_FACE Body Boundaries, Anomalie digital_arts, No. 2, Paris, France, http://alumni.media.mit.edu/~flavia/publications.html.

Stauffer, Chris, et al., "Learning Patterns of Activity Using Real-Time Tracking," Aug. 2000, IEEE Transaction on Pattern Analysis and Machine Intelligence, vol. 22, No. 8, pp. 747-757.

Supreme Particles, "Plasma/Architexture," 1994, available online at http://www.particles.de/paradocs/plasma/plasma_e.html, downloaded on May 21, 2007.

Supreme Particles; R111, 1999, available online at http://www.r111.org, obtained Jul. 12, 2005, XP-002989704.

Tan, P, et al., "Highlight Removal by Illumination-Constrained Inpainting," Ninth IEEE International Conference on Computer Vision, Oct. 13-16, 2003.

The History of Microsoft Surface, downloaded from http://www.microsoft.com/presspass/presskits/surfacecomputing/docs/SurfaceHistoryBG.doc on Sep. 24, 2009.

Torr, P.H.S. et al., "The Development and Comparison of Robust Methods for Estimating the Fundamental Matrix," Sep./Oct. 1997, International Journal of Computer Vision, vol. 24, No. 3, pp. 271-300.

Toth, Daniel et al., "Illumination-Invariant Change Detection," Apr. 2-4, 2000, 4th IEEE Southwest Symposium on Image Analysis and Interpretation, p. 3.

Trefzger, Petra, "Vorwerk," 2000, art installation, description available online at http://petracolor.de/ cited on Jan. 17, 2005 during opposition of European Application No. 02739710.8, filed Jun. 4, 2002.

Utterback, Camille, et al., "Text Rain,"1999, art installation, available online at www.camilleutterback.com/textrain.html, Mar. 16, 2007.

Vogt, Florian et al., "Highlight Substitution in Light Fields," IEEE International Conference on Image Processing, Sep. 22-25, 2002.

Wang, Junxian, et al., "Specular reflection removal for human detection under aquatic environment," Jun. 27-Jul. 2, 2004 IEEE Conference on Computer and Pattern Recognition Workshop (CVPRW04) vol. 8, pg. 130.

Wellner, Pierre, "Interacting with paper on the DigitalDesk," Jul. 1993, Communications of the ACM, Special issue on computer augmented environments: back to the real world, vol. 36, Issue 7, pp. 87-96.

Wellner, Pierre, "Digital Desk Calculator:Tangible Manipulation on a Desktop Display" Proceedings of the Symposium on User Interface Software and Technol (UIST), Hilton Head, S. Carolina, Nov. 11-13, 1991.

Wilson, Andrew, "PlayAnywhere: A Compact Interactive Tabletop Projection-Vision System," ACM Symposium on User Interface Software and Technology (UIST), Oct. 23-27, 2005, Seattle, Washington, U.S.A.

Xiao, Yang; "Throughput and Delay Limits of IEEE 802.11," IEEE Communications Letters, vol. 6, No. 8, pp. 355-357, Aug. 2002.

International Preliminary Report on Patentability for PCT/US2004/035477, filed Oct. 25, 2004.

International Search Report for PCT/US2004/035477, filed Oct. 25, 2004.

Written Opinion of the International Searching Authority for PCT/US2004/035477, filed Oct. 25, 2004.

(56) References Cited

OTHER PUBLICATIONS

International Preliminary Report on Patentability for PCT/US2004/041318, filed Dec. 9, 2004.
International Search Report for PCT/US2004/041318, filed Dec. 9, 2004.
Written Opinion of the International Searching Authority for PCT/US2004/041318, filed Dec. 9, 2004.
International Preliminary Report on Patentability for PCT/US2006/030720, filed on Aug. 4, 2006.
International Search Report for PCT/US2006/030720, filed Aug. 4, 2006.
Written Opinion of the International Searching Authority for PCT/US2006/030720, filed Aug. 4, 2006.
International Preliminary Report on Patentability for PCT/US2005/008984, filed Mar. 18, 2005.
International Search Report for PCT/US2005/008984, filed Mar. 18, 2005.
Written Opinion of the International Searching Authority for PCT/US2005/008984, filed Mar. 18, 2005.
International Preliminary Report on Patentability for PCT/US2004/041320, filed Dec. 9, 2004.
International Search Report for PCT/US2004/041320, filed Dec. 9, 2004.
Written Opinion of the International Searching Authority for PCT/US2004/041320, filed Dec. 9, 2004.
International Preliminary Report on Patentability for PCT/US2004/041319, filed Dec. 9, 2004.
International Search Report for PCT/US2004/041319, filed Dec. 9, 2004.
Written Opinion of the International Searching Authority for PCT/US2004/041319, filed Dec. 9, 2004.
Article 96(2) Communication dated in European Application No. 02739710.8, dated Mar. 31, 2004.
Observation by third party Michael Saup cited during opposition of European Application No. 02739710.8 filed Jun. 4, 2002, dated Jan. 17, 2005.
Observation by third party Petra Trefzger cited during opposition of European Application No. 02739710.8 filed Jun. 4, 2002, dated Jan. 17, 2005.
Observation by third party Simon Penny cited during opposition of European Application No. 02739710.8 filed Jun. 4, 2002, dated Jan. 17, 2005.
Article 96(2) Communication in European Application No. 02739710.8, dated Feb. 25, 2005.
Summons to Attend Oral Proceedings in European Application No. 02739710.8, dated Aug. 12, 2005.
Notice of Opposition in European Application No. 02739710.8 dated May 14, 2007.
Affidavit of Daniel Barthels regarding EffecTV, dated May 15, 2007 (partial machine translation), cited during opposition of European Application No. 02739710.8, filed Jun. 4, 2002.
Letter dated from Christian Zuckschwerdt regarding EffecTV, (partial machine translation), cited during opposition of European Application No. 02739710.8, filed Jun. 4, 2002, May 16, 2007.
Communication dated Dec. 10, 2008 from Patentanwalt attaching article by Katy Bachman, entitled "Reactrix Up for Sale," cited during opposition of European Application No. 02739710.8, filed Jun. 4, 2002.
Summons to Attend Oral Proceedings in European Application No. 02739710.8, dated Jun. 12, 2009.
Decision revoking the European Patent in European Application No. 02739710.8, dated Dec. 28, 2009.
Provision of a copy of the minutes in European Application No. 02739710.8, dated Dec. 28, 2009.
Letter of the opponent O2 in European Application No. 02739710.8, filed Jun. 4, 2002, dated May 28, 2010.
Notice of Opposition in European Application No. 02739710.8, dated Aug. 23, 2010.
International Preliminary Examination Report for PCT/US2002/017843, filed Jun. 4, 2002.
Written Opinion for PCT/US2002/017843, filed Jun. 4, 2002.
International Search Report for PCT/US2002/017843, filed Jun. 4, 2002, dated Feb. 5, 2003.
Extended Search Report for European Application No. 06010825.5, filed Jun. 4, 2002, dated Jul. 6, 2006.
International Preliminary Report on Patentability for PCT/US2004/035478, filed Oct. 25, 2004.
International Search Report for PCT/US2004/035478, filed Oct. 25, 2004.
Written Opinion of the International Searching Authority for PCT/US2004/035478, filed Oct. 25, 2004.
Invitation to Pay Additional Fees and Partial international Search Report on Patentability for PCT/US2004/035478, filed Oct. 25, 2004.
International Preliminary Report on Patentability for PCT/US2008/059900, filed on Apr. 10, 2008.
International Search Report for PCT/US2008/059900, filed Apr. 10, 2008.
Written Opinion of the International Searching Authority for PCT/US2008/059900, filed Apr. 10, 2008.
Official Report in Australian Application No. 2008299883, dated Dec. 8, 2010.
International Preliminary Report on Patentability for PCT/US2008/10750, filed Sep. 15, 2008.
International Search Report for PCT/US2008/10750, filed Sep. 15, 2008.
International Search Report for PCT/US03/40321, filed Dec. 15, 2003.
Office Action in U.S. Appl. No. 12/400,772, dated Oct. 6, 2011.
Examiner Interview Summary Record in U.S. Appl. No. 12/400,772, dated Dec. 7, 2011.
Notice of Allowance in U.S. Appl. No. 12/400,772, dated Apr. 13, 2012.

* cited by examiner

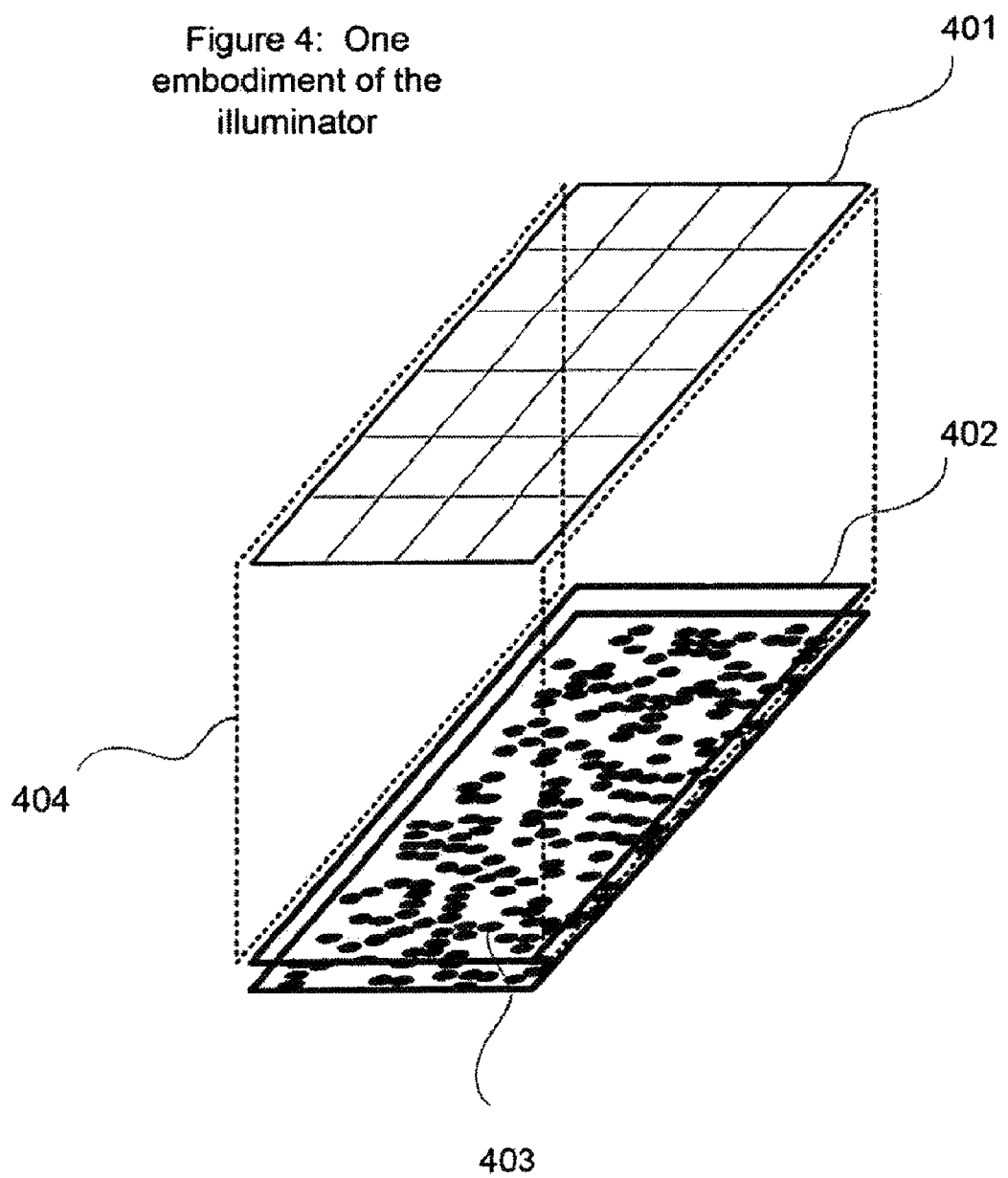
Figure 4: One embodiment of the illuminator

DISPLAY WITH BUILT IN 3D SENSING CAPABILITY AND GESTURE CONTROL OF TV

CROSS-REFERENCE TO RELATED APPLICATIONS

This application is a continuation of U.S. application Ser. No. 13/591,054, filed Aug. 21, 2012, entitled "DISPLAY WITH BUILT IN 3D SENSING CAPABILITY AND GESTURE CONTROL OF TV," which is a continuation of U.S. application Ser. No. 12/400,772, filed Mar. 9, 2009, entitled "DISPLAY WITH BUILT IN 3D SENSING," issued as U.S. Pat. No. 8,259,163, which claims the priority benefit of U.S. Provisional Patent Application Ser. No. 61/034,828, filed Mar. 7, 2008 and entitled "DISPLAY WITH BUILT IN 3D SENSING CAPABILITY AND GESTURE CONTROL OF TV," each of which are hereby expressly incorporated by reference in their entireties.

BACKGROUND

Field

The present invention generally related to vision systems. More specifically, the present invention related to a gesture driven vision system that allows a computing device to perceive the physical world and related interactions in three-dimensions.

Description of the Related Art

Vision systems that allow computers to perceive the physical world in three dimensions are being developed for use in a variety of applications. Among those applications are gesture interfaces. While attempts have been made for gesture control to supersede the use of remote controls used in televisions and television accessories such as game controllers for video game systems, such attempts have met with little to no success.

These prior art systems have been limited by their ability (or lack thereof) to track the hands or some other appendage of a user in a real-world setting. Complications with such interfaces and their inability to process information include the fact that users may sit in various locations around a room and not directly in front of a television. Other problems arise as a result of variations in ambient light and background.

SUMMARY

In a first claimed embodiment, a system comprising a 3D vision system configured to provide vision data; a computer in communication with the 3D vision system, the computer configured to process the vision data; and a display in communication with the computer, the display configured to change in response to the processed vision data is disclosed.

BRIEF DESCRIPTION OF THE FIGURES

FIG. 4 illustrates an exemplary illuminator as may be implemented in the context of the present three dimensional vision system.

DETAILED DESCRIPTION OF SPECIFIC EMBODIMENTS

Exemplary embodiments of the present invention include a display with a built-in 3D vision system and computer. Potential implementations of the 3D vision hardware include, but are not limited to stereo vision, structured light accompanied by one or two cameras, laser rangefinders, and time-of-flight cameras.

The computer may take many forms including, but not limited to, a video game console, personal computer, or a media player, such as a digital video recorder, or DVD player. Vision software may run on a separate embedded computer, a main computer, or some combination of the two. Various processors, memory, interfaces (both user and network) as known in the art may be included to allow for exchanges of information and execution of various software modules, engines, and applications.

In general, the vision software may include perspective transforms, person segmentation, body tracking, hand tracking, gesture recognition, touch detection, and face tracking. In the case of a stereo vision system, the vision software may also include stereo processing, generating depth from disparity.

A variety of other software modules may use vision data. An interactive entertainment engine may use the vision data to create interactive games that can be played using body motion. A TV controller may use the vision data to allow the user to control the display's settings. A media player may use the vision data to control the playing of digital media such as a DVD or MP3. A user analysis module may use the vision data to determine who is near the display and how they are behaving. Any of the aforementioned modules may use an internet connection or send images to the display for display to a user.

Figure 1:
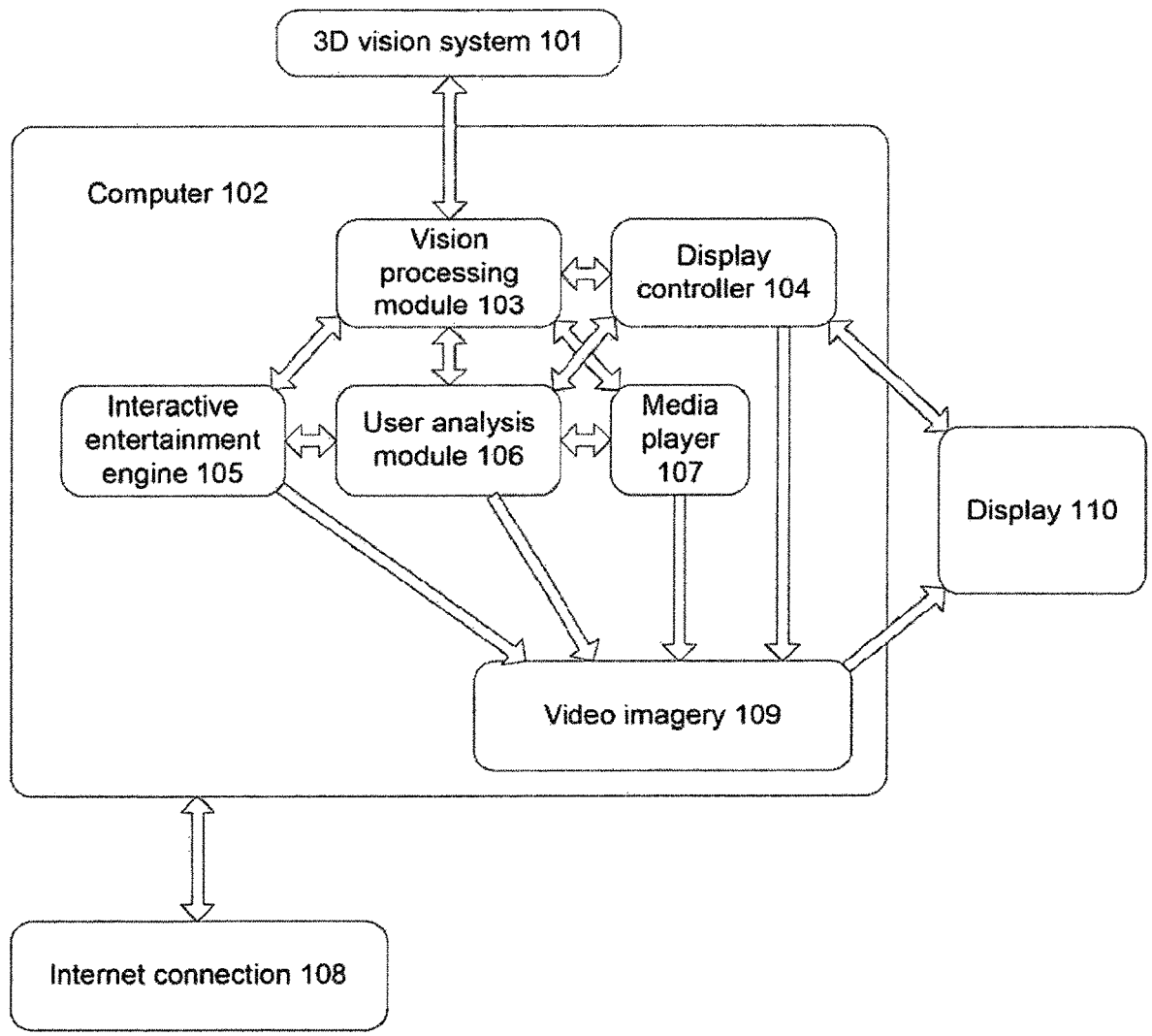
FIG. 1 illustrates the flow of information in a three dimensional vision system.

FIG. 1 illustrates the flow of information in a three dimensional vision system. FIG. 1 shows the flow of information according to one embodiment of the 3D vision system. The 3D vision system 101 provides data to a computer 102 such as the main computer, the embedded computer, or a combination computer system. Each stage of vision processing may occur within the 3D vision system 101, within a vision processing module 103, or both.

Information from execution of the vision processing module 103 may be used to control the 3D vision system 101. For example, the vision processing module 103 may send signals to alter the gain level of the cameras in the vision system 101 in order to properly 'see' objects in the camera's view. The output of the vision processing in the 3D vision system 101 and/or from execution of the vision processing module 103 may be passed to a display controller 104, an interactive entertainment engine 105, a user analysis module 106, and/or a media player 107. These modules (104, 105, 106, 107) may be designed to use the vision data to track or recognize user positions, hand positions, head positions, gestures, body shapes, and depth images.

The display controller 104 may use vision data from execution of the vision processing module 103 to control the display 110. For example, specific gestures detected by the vision processing module 103, such as a thumbs up or thumbs down, may be used to make specific changes to the display 110 such as turning the display on or off, adjusting the audio volume, changing the channel or input, or adjusting image parameters. Functionality traditionally controlled via a remote control may be controlled via gestures. The display controller 104 may further change the brightness of the display 110 or other parameters based on ambient light conditions detected by the 3D vision system 101.

The interactive entertainment engine 105 may use vision data to drive interactive graphical content. Examples of the interactive content engines 105 include Adobe's Flash platform and Flash content, the Reactrix Effects Engine and Reactrix content, and a computer game or console video game.

The media player 107 may use vision data from execution of the vision processing module 103 in order to control the playing of image, audio, or video media on the display 110. For example, specific gestures detected by execution of the vision processing module 103, such as a thumbs up or thumbs down, may be used to control the play process. Examples of controlling the play process include triggering a fast forward or pause, or navigating a playlist or DVD menu.

The user analysis module 106 may be executed to use vision data in order to identify users and track their behavior. Identification may occur using face recognition based on data generated from the execution of the vision processing module 103. Alternatively, identification may be established using a login process.

Once identification has occurred, identification of a particular user may be maintained using body tracking software so that each user's identification remains known regardless of whether their face is visible or whether they switch locations. User behavior may also be observed. For example, user position, movement, posture and facial expression may be tracked in order to determine if each user is looking at the display, and what emotion and level of interest they are experiencing relative to the content. This information may be sent to the other modules (e.g., 104, 105, 107).

Data from the user analysis module 106 may be used in execution of the other modules (e.g., 104, 105, 107). For example, the display controller 104 may use this data to automatically switch to a particular user's preferred settings when they enter the room. Furthermore the display controller 104 may go into an energy saving mode or turn off entirely if no one is present or paying attention for specified period of time. The interactive entertainment engine 105 may use this data to do a variety of things, including but not limited to bringing up the identified user's profile when they begin to play, mapping each user's actions to a specific player in the game, pausing the game when the user is not paying attention, and altering the game based on the user's emotions such as by making the game harder if they look frustrated or easier if they look relaxed.

The media player 107 uses this data to do a variety of things, including but not limited to bringing up the identified user's profile when they are looking at their content library, pausing a song, movie, or slideshow if the user walks away, or altering the content played based on the users' emotions. Any of the modules associated with the computer 102 may take advantage of an Internet or other network connection 108 to send and/or receive data. This connection may take a variety of forms, including but not limited to a cellular broadband connection, a DSL connection, or an 802.11 wireless connection.

Video images generated through execution of any of the modules (e.g., 104, 105, 106, 107) may be rendered on graphics hardware 109 and sent to the display 110 for displaying to a user. The modules discussed herein (e.g., 104, 105, 106, 107) may also provide the vision processing module 103 and/or the 3D vision system 101 with commands in order to optimize how vision data is gathered.

Figure 2:
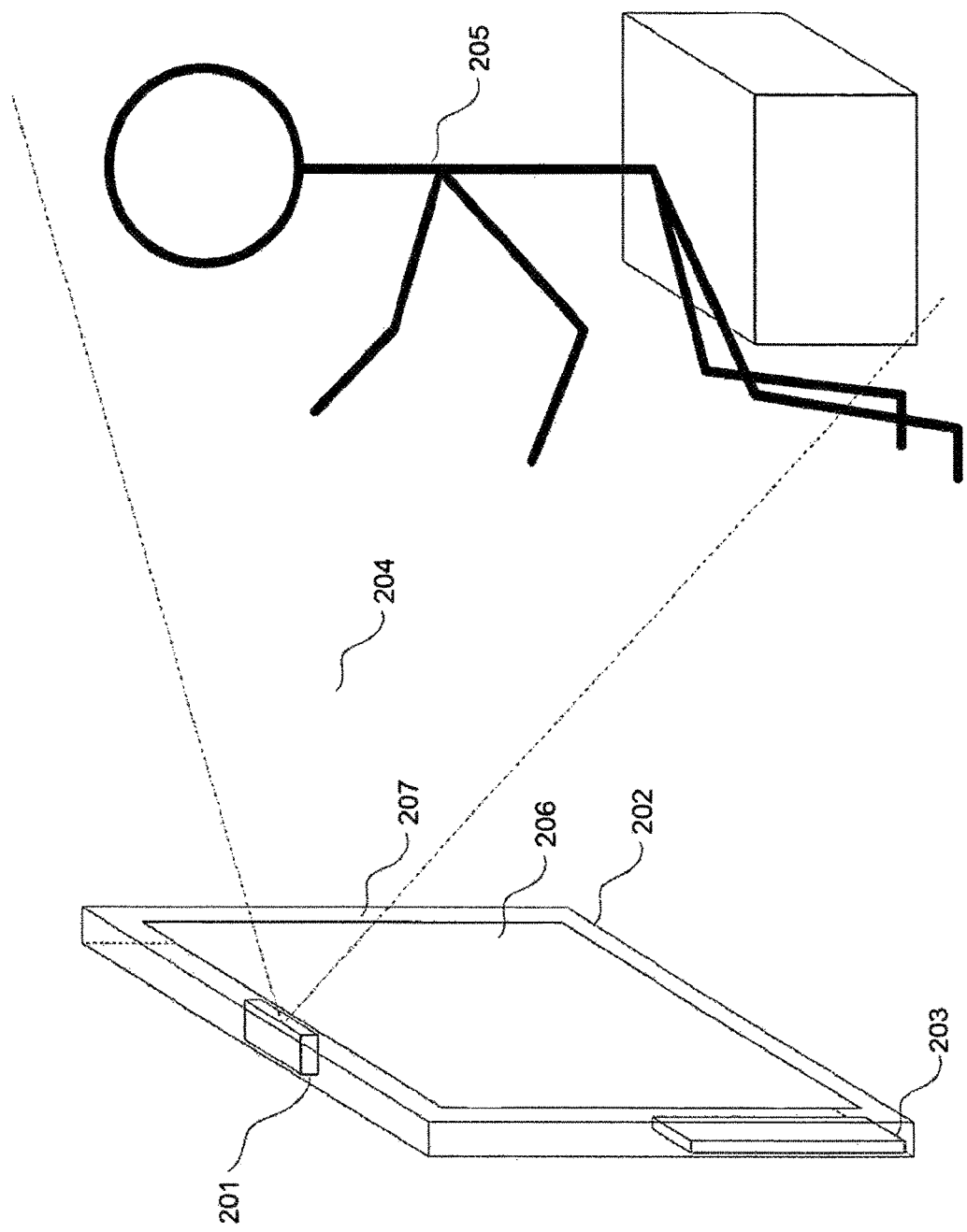
FIG. 2 illustrates an exemplary configuration of a three dimensional vision system in a display device.

FIG. 2 illustrates an exemplary configuration of a three dimensional vision system in a display device. FIG. 2 shows a simplified view of one possible configuration of the hardware. Vision hardware 201 in FIG. 2 is built into the border of a display 202. A separate computer 203 takes input from the vision hardware 201 and provides video (and potentially audio) content for display on the display 202. The vision hardware 201 is able to see objects in an interactive space 204. One or more users 205 may be in the interactive space 204 in order to interact with the vision interface.

A front border 207 of the display 202 allows the vision hardware 201 a view of the interactive space 204. This may be accomplished in a variety of ways. For example, the vision hardware 201 may operate on infrared light and the front border 207 may consist primarily of a material that is transparent to infrared light. Some materials that are transparent to infrared are also opaque to visible light and appear black, making the vision hardware 202 invisible to the human eye and preserving the aesthetics of the display 202. Examples of such materials include the Kodak Wratten #87C filter.

As long as the portion of the border 207 in front of the vision system 201 is transparent to light from the vision system 201, it does not matter whether the rest of the border 207 is covered in such a material. For aesthetic reasons, the entirety of the border 207 may be covered with the IR-transparent material. Alternately, the border 207 may include holes that enable the vision system 201 to 'see' through border 207. The vision system 201 and/or the computer 203 may alternatively be in separate enclosures outside of the display 202.

Figure 3:
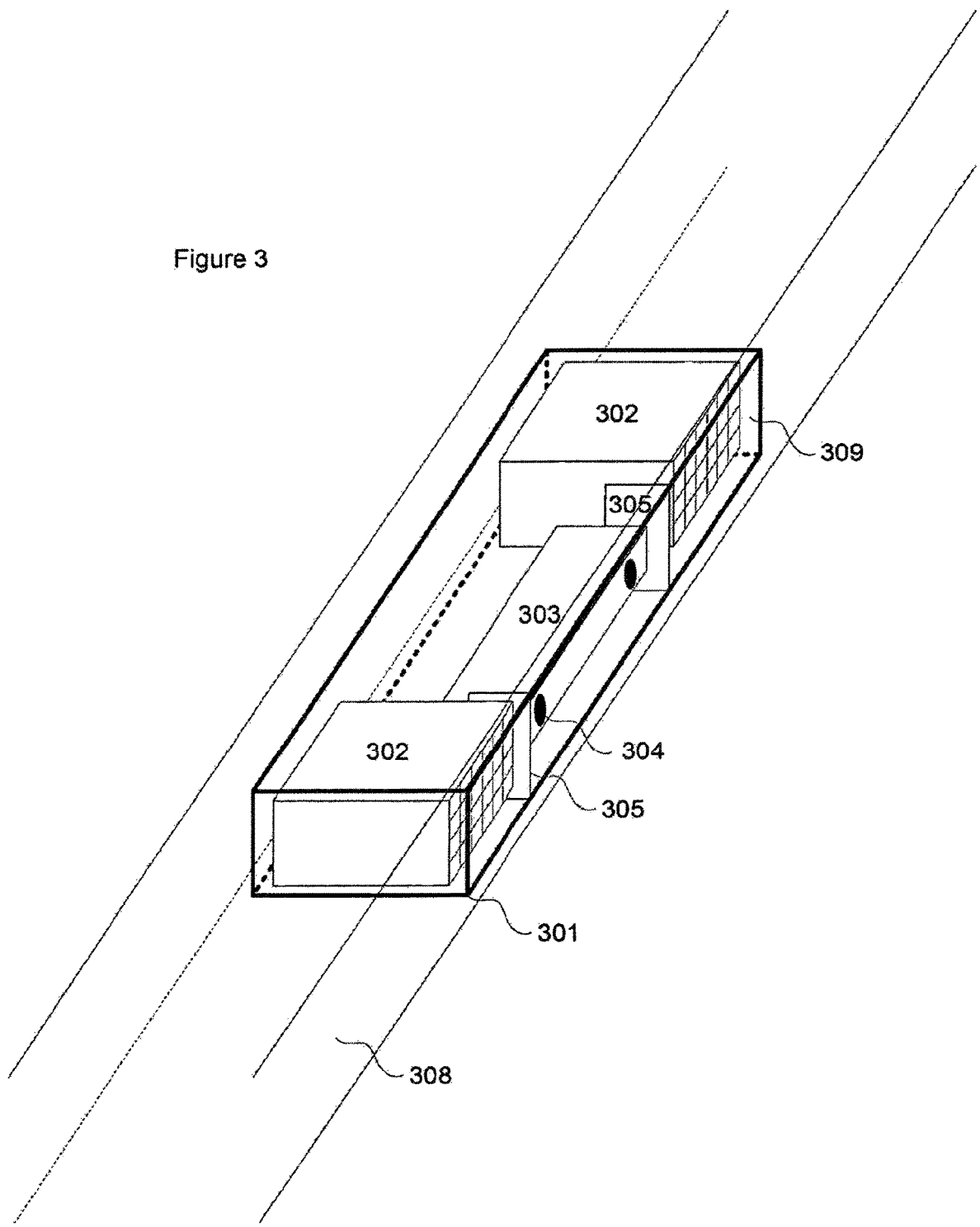
FIG. 3 illustrates an embodiment of the three dimensional vision system as referenced in the context of FIG. 2.

FIG. 3 illustrates an embodiment of the three dimensional vision system as referenced in the context of FIG. 2. The displayed configuration shows a stereo vision system. Note that power and data cables have been omitted from the diagram for clarity.

A vision system 301 is installed inside the enclosure of a display 308. The vision system 301 includes one or more illuminators 302. Each of the illuminators 302 creates light with a spatially varying textured pattern. This light pattern illuminates the volume of space viewed by the camera such as any of the cameras discussed herein (e.g., the separate camera 303). The pattern has enough contrast to be seen by the camera over the ambient light, and has a high spatial frequency that gives the vision software detailed texture information.

A stereo camera 303, with two or more cameras 304, may also be contained in the vision system 301. The stereo camera 303 may simply pass raw camera images, in analog or digital format, to a separate computer (not shown) for vision processing. Alternately, the stereo camera 303 may contain specialized circuitry or an embedded computer capable of doing onboard vision processing.

Commercially available stereo cameras include for example, the Tyzx DeepSea™ and the Point Grey Bumblebee™. Such cameras may be monochrome or color, and may be sensitive to one or more specific bands of the electromagnetic spectrum including visible light, near-infrared, far infrared, and ultraviolet. Some cameras, like the Tyzx DeepSea,™ do much of their stereo processing within the camera enclosure using specialized circuitry and an embedded computer.

The illuminators 302 put out light that is invisible or close to invisible to a human user, and the camera 303 is sensitive to this light. This light may be in the near-infrared frequency. A front side 309 of the vision system 301 may contain a material that is transparent to light emitted by the illuminators. This material may also be opaque to visible light, obscuring the internal workings of the vision system 301 from a human user. Alternately, the front side 309 may consist of a fully opaque material that contains holes letting light out of the illuminator 302 and into the camera 303. The front side 309 may be part of the front border of the display 308. The vision box 301 may contain one or more opaque partitions 305 to prevent the illuminator's 302 light from bouncing around inside the box and into the camera 303. This ensures the camera 303 is able to capture a high quality, high contrast image. The overall form factor of the vision system 301 may be relatively flat in order to properly fit inside the display 308. This can be achieved by placing the illuminators 302 to the side of the stereo camera 303, and creating illuminators 302 that are relatively flat in shape.

The vision system 301 may have a connection that transfers camera data, whether raw or processed, analog or digital, to the computer 203 for processing. This data may be transferred wirelessly, on a separate cable from the power cable, or on a wire that is attached to the power cable. Thus, there may be only a single cable between the vision system 301 and the separate computer 203, with this single cable containing wires that provide both power and data. The illuminator 302 may contain monitoring circuits that would allow an external device to assess its current draw, temperature, number of hours of operation, or other data. The current draw may indicate whether part or all of the illuminator 302 has burnt out. This data may be communicated over a variety of interfaces including serial and USB.

The vision system 301 may contain a computer (not shown) that performs processing of the camera data. This processing may include, but is not limited to, stereo processing, generating depth from disparity, perspective transforms, person segmentation, body tracking, hand tracking, gesture recognition, touch detection, and face tracking. Data produced by the vision software may also be used to create interactive content that utilizes a vision interface. The content may include a representation of the user's body and/or hands, allowing the users to tell where they are relative to virtual objects in the interactive content. This content may be sent to the display 308 for display to a user.

The 3D vision system 301 may consist of other approaches, including but not limited to, laser rangefinders, time-of-flight cameras, and structured light accompanied by one or two cameras.

If the vision system 101 comprises a stereo vision system, 3D computer vision techniques using algorithms such as those based on the Marr-Poggio algorithm may take as input two or more images of the same scene taken from slightly different angles. These Marr-Poggio-based algorithms are examples of stereo algorithms. These algorithms may find texture patches from the different cameras' images that correspond to the same part of the same physical object. The disparity between the positions of the patches in the images allows the distance from the camera to that patch to be determined, thus providing 3D position data for that patch.

The performance of this algorithm degrades when dealing with objects of uniform color because uniform color makes it difficult to match up the corresponding patches in the different images. Thus, since the illuminator 302 creates light that is textured, shining the illuminator 302 onto the zone seen by the camera can improve the distance estimates of some 3D computer vision algorithms when processing the camera's data. By lighting objects in the interactive area with a pattern of light, the illuminator 302 improves the amount of texture data that may be used by the stereo algorithm to match patches.

Several methods may be used to remove inaccuracies and noise in the 3D data. For example, background methods may be used to mask out 3D data from areas of the camera's field of view that are known to have not moved for a particular period of time. These background methods (also known as background subtraction methods) may be adaptive, allowing the background methods to adjust to changes in the background over time. These background methods may use luminance, chrominance, and/or distance data from the cameras in order to form the background and determine foreground. Once the foreground is determined, 3D data gathered from outside the foreground region may be removed.

A color camera may be added to the vision system 301 to obtain chrominance data for the 3D data of the user and other objects in front of the screen. This chrominance data may be used to acquire a color 3D representation of the user, allowing their likeness to be recognized, tracked, and/or displayed on the screen. Noise filtering may be applied to either the depth image (which is the distance from the camera to each pixel of the camera's image from the camera's point of view), or directly to the 3D data. For example, smoothing and averaging techniques such as median filtering may be applied to the camera's depth image in order to reduce depth inaccuracies. As another example, isolated points or small clusters of points may be removed from the 3D data set if they do not correspond to a larger shape; thus eliminating noise while leaving users intact.

The 3D data may be analyzed in a variety of ways to produce high level information. For example, a user's fingertips, fingers, and hands may be detected. Methods for doing so include various shape recognition and object recognition algorithms. Objects may be segmented using any combination of 2D/3D spatial, temporal, chrominance, or luminance data. Furthermore, objects may be segmented under various linear or non-linear transformations of the aforementioned domains. Examples of object detection algorithms include, but are not limited to deformable template matching, Hough transforms, and the aggregation of spatially contiguous pixels/voxels in an appropriately transformed space.

As another example, the 3D points belonging to a user may be clustered and labeled such that the cluster of points belonging to the user is identified. Various body parts, such as the head and arms of a user may be segmented as markers. Points may also be also clustered in 3-space using unsupervised methods such as k-means, or hierarchical clustering. The identified clusters may then enter a feature extraction and classification engine. Feature extraction and classification routines are not limited to use on the 3D spatial data buy may also apply to any previous feature extraction or classification in any of the other data domains, for example 2D spatial, luminance, chrominance, or any transformation thereof.

A skeletal model may be mapped to the 3D points belonging to a given user via a variety of methods including but not limited to expectation maximization, gradient descent, particle filtering, and feature tracking. In addition, face recognition algorithms, such as eigenface or fisherface, may use data from the vision system, including but not limited to 2D/3D spatial, temporal, chrominance, and luminance data, in order to identify users and their facial expressions. Facial recognition algorithms used may be image based, or video based. This information may be used to identify users, especially in situations where they leave and return to the interactive area, as well as change interactions with displayed content based on their face, gender, identity, race, facial expression, or other characteristics.

Fingertips or other body parts may be tracked over time in order to recognize specific gestures, such as pushing, grabbing, dragging and dropping, poking, drawing shapes using a finger, pinching, and other such movements. The 3D vision system 101 may be specially configured to detect specific objects other than the user. This detection can take a variety of forms; for example, object recognition algorithms may recognize specific aspects of the appearance or shape of the object, RFID tags in the object may be read by a RFID reader (not shown) to provide identifying information, and/or a light source on the objects may blink in a specific pattern to provide identifying information.

Building the camera into the display may help to reduce the amount of calibration required for the 3D vision system 101. Since the relative position of the 3D vision system 101 to the display (e.g., the display 110) and the size of the display can both be known ahead of time, it is easy to determine the position of any object seen by the 3D vision system 101 relative to the images on the display. The data from the 3D vision system 101 can be perspective-transformed into a new coordinate space that determines the position of any detected objects relative to the display surface. This makes it possible, for example, to let a user point at a specific object on the screen using their arm, and have the direction of the arm directly point to the object they are selecting.

FIG. 4 illustrates an embodiment of the illuminator 302. Light from a lighting source 403 is re-aimed by a lens 402 so that the light is directed towards the center of a lens cluster 401. In one embodiment, the lens 402 is adjacent to the lighting source 403. In one embodiment, the lens 402 is adjacent to the lighting source 403 and has a focal length similar to the distance between the lens cluster 401 and the lighting source 403. This particular embodiment ensures that each emitter's light from the lighting source 403 is centered onto the lens cluster 401.

In one embodiment, the focal length of the lenses in the lens cluster 401 is similar to the distance between the lens cluster 401 and the lighting source 403. This focal length ensures that emitters from the lighting source 403 are nearly in focus when the illuminator 302 is pointed at a distant object. The position of components including the lens cluster 401, the lens 402, and/or the lighting source 403 may be adjustable to allow the pattern to be focused at a variety of distances. Optional mirrors 404 bounce light off of the inner walls of the illuminator 302 so that emitter light that hits the walls passes through the lens cluster 401 instead of being absorbed or scattered by the walls. The use of such mirrors allows low light loss in the desired "flat" configuration, where one axis of the illuminator is short relative to the other axes.

The lighting source 403 may include a cluster of individual emitters. The potential light sources for the emitters in the lighting source 403 vary widely; examples of the lighting source 403 include but are not limited to LEDs, laser diodes, incandescent bulbs, metal halide lamps, sodium vapor lamps, OLEDs, and pixels of an LCD screen. The emitter may also be a backlit slide or backlit pattern of holes. In one such embodiment, each emitter aims the light along a cone toward the lens cluster 401. The pattern of emitter positions can be randomized to varying degrees.

The density of emitters on the lighting source 403 may vary across a variety of spatial scales. This ensures that the emitter will create a pattern that varies in brightness even at distances where it is out of focus. The overall shape of the light source may be roughly rectangular. This helps ensure that with proper design of the lens cluster 401, the pattern created by the illuminator 302 covers a roughly rectangular area. This facilitates easy clustering of the illuminators 302 to cover broad areas without significant overlap.

The lighting source 403 may be on a motorized mount, allowing it to move or rotate. In one embodiment, the emitters in the pattern may be turned on or off via an electronic control system, allowing the pattern to vary. In this case, the emitter pattern may be regular, but the pattern of emitters that are on may be random. Many different frequencies of emitted light are possible. For example, near-infrared, far-infrared, visible, and ultraviolet light can all be created by different choices of emitters. The lighting source 403 may be strobed in conjunction with the camera(s) of the computer vision system allowing ambient light to be reduced.

The second optional component, a condenser lens or other hardware designed to redirect the light from each of the emitters in lighting source 403, may be implemented in a variety of ways. The purpose of this component, such as the lens 402 discussed herein, is to reduce wasted light by redirecting the emitters' light toward the center of the lens cluster 401, ensuring that as much of it goes through lens cluster 401 as possible.

In some embodiments, each emitter may be mounted such that it emits light in a cone perpendicular to the surface of the lighting source 403. If each emitter emits light in a cone, the center of the cone may be aimed at the center of the lens cluster 401 by using a lens 402 with a focal length similar to the distance between the lens cluster 401 and the lighting source 403.

The angle of the cone of light produced by the emitters may be chosen such that the cone will completely cover the surface of the lens cluster 401. If the lighting source 403 is designed to focus the light onto the lens cluster 401 on its own, for example by individually angling each emitter, then the lens 402 may not be useful. Implementations for the lens 402 include, but are not limited to, a convex lens, a plano-convex lens, a Fresnel lens, a set of microlenses, one or more prisms, and a prismatic film.

The third optical component, the lens cluster 401, is designed to take the light from each emitter and focus it onto a large number of points. Each lens in the lens cluster 401 may be used to focus each emitter's light onto a different point. Thus, the theoretical number of points that can be created by shining the lighting source 403 through the lens cluster 401 is equal to the number of emitters in the lighting source multiplied by the number of lenses in the lens cluster 401. For an exemplary lighting source with 200 LEDs and an exemplary emitter with 36 lenses, this means that up to 7200 distinct bright spots can be created. With the use of mirrors 404, the number of points created is even higher since the mirrors create "virtual" additional lenses in the lens cluster 401. This means that the illuminator 102 can easily create a high resolution texture that is useful to a computer vision system.

All the lenses in the lens cluster 401 may have a similar focal length. The similar focal length ensures that the pattern is focused together onto an object lit by the illuminator 102. The lenses 402 may alternatively have somewhat different focal lengths so at least some of the pattern is in focus at different distances.

The user(s) or other objects detected and processed by the system may be represented on the display in a variety of ways. This representation on the display may be useful in allowing one or more users to interact with virtual objects shown on the display by giving them a visual indication of their position relative to the virtual objects.

Forms that this representation may take include, but are not limited to: a digital shadow of the user(s) or other objects such as a two dimensional (2D) shape that represents a projection of the 3D data representing their body onto a flat surface; a digital outline of the user(s) or other objects, which can be thought of as the edges of the digital shadow; the shape of the user(s) or other objects in 3D, rendered in the virtual space, which may be colored, highlighted, rendered, or otherwise processed arbitrarily before display; images, icons, or 3D renderings representing the users' hands or other body parts, or other objects whereby the shape of the user(s) rendered in the virtual space, combined with markers on their hands are displayed when the hands are in a position to interact with on-screen objects (e.g., the markers on the hands may only show up when the hands are pointed at the screen; points that represent the user(s) (or other objects) from the point cloud of 3D data from the vision system, displayed as objects, which may be small and semitransparent.

Other forms of representation include cursors representing the position of users' fingers, which may be displayed or change appearance when the finger is capable of a specific type of interaction in the virtual space; objects that move along with and/or are attached to various parts of the users' bodies (e.g., a user may have a helmet that moves and rotates with the movement and rotation of the user's head); digital avatars that match the body position of the user(s) or other objects as they move whereby the digital avatars are mapped to a skeletal model of the users' positions; or any combination of the aforementioned representations.

In some embodiments, the representation may change appearance based on the users' allowed forms of interactions with on-screen objects. For example, a user may be shown as a gray shadow and not be able to interact with objects until they come within a certain distance of the display, at which point their shadow changes color and they can begin to interact with on-screen objects. In some embodiments, the representation may change appearance based on the users' allowed forms of interactions with on-screen objects. For example, a user may be shown as a gray shadow and not be able to interact with objects until they come within a certain distance of the display, at which point their shadow changes color and they can begin to interact with on-screen objects.

Given the large number of potential features that can be extracted from the 3D vision system 101 and the variety of virtual objects that can be displayed on the screen, there are a large number of potential interactions between the users and the virtual objects. Some examples of potential interactions include 2D force-based interactions and influence image based interactions that can be extended to 3D as well. Thus, 3D data about the position of a user could be used to generate a 3D influence image to affect the motion of a 3D object. These interactions, in both 2D and 3D, allow the strength and direction of the force the user imparts on virtual object to be computed, giving the user control over how they impact the object's motion.

Users may interact with objects by intersecting with them in virtual space. This intersection may be calculated in 3D, or the 3D data from the user may be projected down to 2D and calculated as a 2D intersection. Visual effects may be generated based on the 3D data from the user. For example, a glow, a warping, an emission of particles, a flame trail, or other visual effects may be generated using the 3D position data or some portion thereof. Visual effects may be based on the position of specific body parts. For example, a user could create virtual fireballs by bringing their hands together. Users may use specific gestures to pick up, drop, move, rotate, or otherwise modify virtual objects onscreen.

The virtual space depicted on the display may be shown as either 2D or 3D. In either case, the system merges information about the user with information about the digital objects and images in the virtual space. If the user is depicted two-dimensionally in the virtual space, then the 3D data about the user's position may be projected onto a 2D plane.

The mapping between the physical space in front of the display and the virtual space shown on the display can be arbitrarily defined and can even change over time. The actual scene seen by the users may vary based on the display chosen. In one embodiment, the virtual space (or just the user's representation) is two-dimensional. In this case, the depth component of the user's virtual representation may be ignored.

The mapping may be designed to act in a manner similar to a mirror, such that the motions of the user's representation in the virtual space as seen by the user are akin to a mirror image of the user's motions. The mapping may be calibrated such that when the user touches or brings a part of their body near to the screen, their virtual representation touches or brings the same part of their body near to the same part of the screen. In another embodiment, the mapping may show the user's representation appearing to recede from the surface of the screen as the user approaches the screen.

There are numerous potential uses for the presently disclosed interface. The potential uses include sports where users may box, play tennis (with a virtual racket), throw virtual balls, or engage in other sports activity with a computer or human opponent shown on the screen; navigation of virtual worlds where users may use natural body motions such as leaning to move around a virtual world, and use their hands to interact with objects in the virtual world; virtual characters where digital character on the screen may talk, play, and otherwise interact with people in front of the display as they pass by it where this digital character may be computer controlled or may be controlled by a human being at a remote location; advertising including interactive product demos and interactive brand experiences; multiuser workspaces where groups of users can move and manipulate data represented on the screen in a collaborative manner; video games where users can play games, controlling their onscreen characters via gestures and natural body movements; clothing where clothes are placed on the image of the user on the display, and allowing them to virtually try on clothes; control of a television without a remote where a user can use gestures to switch channels, alter the volume, turn the TV on or off, or make other changes; control of a digital video recorder, DVD player, or other media player without a remote where a user could use gestures to pause, fast forward, navigate a menu of content options, or make other changes; vision data may be used to control other devices outside the display where a computer may use a wireless network connection to communicate with external devices that control the lighting and temperature for the building.

What is claimed is:

1. A system comprising:
    a display device;
    a three-dimensional vision system comprising:
        stereo cameras;
        one or more illuminators configured to create light with a spatially varying texture pattern, the three-dimensional vision system being coupled to the display in a manner that enables the display to provide interactive virtual content to a user being tracked by the three-dimensional vision system,
wherein the illuminators and stereo cameras are mounted within an enclosure of the display device; and
a computer comprising:
a vision processing module that is programmed to perform stereo processing and that maps a virtual model of fingers of the user to three-dimensional points associated with the user, tracks the fingers over time, and uses the tracked three-dimensional points to detect a gesture of the user;
an interactive content engine that receives output from the vision processing module to drive interactive graphical content; and
graphics hardware that is coupled to the interactive content engine and that renders the interactive graphical content for display on the display device.

2. The system of claim 1, wherein the vision processing module is programmed to track the fingers over time by mapping a skeletal model to the three-dimensional points.

3. The system of claim 1, wherein the vision processing module is programmed to detect the user modifying a virtual object that is displayed via the display device.

4. The system of claim 3, wherein detecting the user modifying the virtual object comprises detecting the user picking up the virtual object.

5. The system of claim 1, wherein the interactive content engine drives interactive graphical content by instructing the graphics hardware to display a representation of the fingers of the user on the display device.

6. The system of claim 5, wherein the interactive content engine is programmed to instruct the graphics hardware to display one or more markers on the representation of the fingers of the user when the fingers are in position to interact with a virtual object displayed on the display device.

7. The system of claim 5, wherein the representation of the fingers of the user comprises cursors representing positions of the fingers of the user.

8. The system of claim 1, wherein the gesture of the user comprises at least one of:
a thumbs up gesture; or
a thumbs down gesture, and wherein the interactive content engine is responsive to the gesture to at least one of:
navigate a menu of media content; or
alter play of media content.

9. The system of claim 1, wherein the interactive content engine is programmed to:
detect an emotion of the user; and
direct the graphics hardware to alter, based on the emotion of the user, the interactive graphical content displayed via the display device.

10. The system of claim 1, wherein the spatially varying texture pattern has enough contrast to be seen by the stereo cameras over ambient light, and has a spatial frequency that provides the vision processing module detailed texture information, and one or more lenses of the illuminators has at least one of:
a fixed focal length that causes the pattern to be nearly in focus when an illuminator of the illuminators is pointed at a distant object; or
an adjustable focal length that allows the pattern to be focused at a variety of distances.

11. The system of claim 8, wherein the interactive content engine is responsive to the gesture to both:
navigate the menu of media content; and
alter play of media content by stopping play of the media content.

12. The system of claim 1, wherein the light with the spatially varying texture pattern includes light that is invisible or close to invisible to a human user.

13. A method comprising:
creating, via one or more illuminators of a three-dimensional vision system comprising stereo cameras and a display device, light with a spatially varying texture pattern,
wherein the illuminators and stereo cameras are mounted within an enclosure of the display device;
detecting positions of fingers of a user via the three-dimensional vision system, the three-dimensional vision system being coupled to a display device in a manner that enables the display device to provide interactive graphical content to the user being tracked by the three-dimensional vision system;
mapping, via a vision processing module that is programmed to perform stereo processing, a virtual model of the fingers of the user to three-dimensional points associated with the user;
tracking the fingers over time;
using the tracked three-dimensional points to detect a gesture of the user;
driving, based on the gesture of the user, the interactive graphical content; and
rendering the interactive graphical content for display on the display device.

14. The method of claim 13, wherein using the tracked three-dimensional points to detect the gesture of the user comprises detecting the user modifying a virtual object that is displayed via the display device.

15. The method of claim 14, wherein detecting the user modifying the virtual object comprises detecting the user picking up the virtual object.

16. The method of claim 13, wherein driving the interactive graphical content comprises instructing graphics hardware to display a representation of the fingers of the user on the display device.

17. The method of claim 16, further comprising instructing the graphics hardware to display one or more markers on the representation of the fingers of the user.

18. The method of claim 13, wherein tracking the fingers over time comprises mapping a skeletal model to the three-dimensional points.

19. The method of claim 13, further comprising:
detecting an emotion of the user; and
altering, based on the emotion of the user, the interactive graphical content displayed via the display device.

20. A non-transitory computer-readable storage having executable instructions stored thereon, the executable instructions configured to cause a computing system having one or more hardware processors to perform operations comprising:
creating, via one or more illuminators of a three-dimensional vision system comprising stereo cameras and a display device, light with a spatially varying texture pattern,
wherein the illuminators and stereo cameras are mounted within an enclosure of the display device;
detecting positions of fingers of a user via a three-dimensional vision system, the three-dimensional vision system being coupled to a display device in a manner that enables the display device to provide interactive graphical content to the user being tracked by the three-dimensional vision system;
mapping, via a vision processing module that is programmed to perform stereo processing, a virtual model of the fingers of the user to three-dimensional points associated with the user;
tracking the fingers over time;
using the tracked three-dimensional points to detect a gesture of the user;
driving, based on the gesture of the user, the interactive graphical content; and
rendering the interactive graphical content for display on the display device.

* * * * *